(12) United States Patent
Ikushima

(10) Patent No.: US 8,249,745 B2
(45) Date of Patent: Aug. 21, 2012

(54) WORK ROBOT EXCELLENT IN WORK RESUMPTION

(75) Inventor: Kazumasa Ikushima, Mitaka (JP)

(73) Assignee: Musashi Engineering, Inc., Tokyo (JP)

(*) Notice: Subject to any disclaimer, the term of this patent is extended or adjusted under 35 U.S.C. 154(b) by 756 days.

(21) Appl. No.: 12/161,071

(22) PCT Filed: Jan. 15, 2007

(86) PCT No.: PCT/JP2007/050388
§ 371 (c)(1),
(2), (4) Date: May 27, 2009

(87) PCT Pub. No.: WO2007/083585
PCT Pub. Date: Jul. 26, 2007

(65) Prior Publication Data
US 2010/0057251 A1 Mar. 4, 2010

(30) Foreign Application Priority Data
Jan. 17, 2006 (JP) ................. 2006-009112

(51) Int. Cl.
*G05B 11/01* (2006.01)
*G05B 19/18* (2006.01)

(52) U.S. Cl. ............. 700/250; 700/21; 700/56; 700/64

(58) Field of Classification Search ............. None
See application file for complete search history.

(56) References Cited

U.S. PATENT DOCUMENTS

| 4,484,287 A | 11/1984 | Gamo et al. | |
|---|---|---|---|
| 4,751,652 A | 6/1988 | Kiya et al. | |
| 5,038,272 A * | 8/1991 | Calcagno et al. | 700/64 |
| 5,170,034 A * | 12/1992 | Seshimo et al. | 219/125.1 |
| 5,170,109 A * | 12/1992 | Yanagita et al. | 318/568.1 |
| 6,097,169 A | 8/2000 | Watanabe et al. | |
| 6,163,124 A * | 12/2000 | Ito et al. | 318/567 |

(Continued)

FOREIGN PATENT DOCUMENTS
DE   4106384 A1   9/1991

(Continued)

OTHER PUBLICATIONS

International Search Report of PCT/JP2007/050388, date of mailing Apr. 17, 2007.

(Continued)

*Primary Examiner* — Khoi Tran
*Assistant Examiner* — Bao Long T Nguyen
(74) *Attorney, Agent, or Firm* — Westerman, Hattori, Daniels & Adrian, LLP

(57) ABSTRACT

A work robot includes a holding unit for holding a work device, holding unit moving means, an information processing unit, a storage unit, and a variable storage unit. The work robot performs work by relatively moving the holding unit and a workpiece in accordance with a program instruction. When execution of the work is in progress, the program successively stores working state information in the variable storage unit. When the program is forced to end in the middle of the work and then the work is to be resumed, the program resumes the work in accordance with the working state information stored in the variable storage unit. Thus, even when the program is forced to end, the work can be resumed from the working state immediately before the forced end.

11 Claims, 7 Drawing Sheets

U.S. PATENT DOCUMENTS

| | | | |
|---|---|---|---|
| 6,249,717 B1 * | 6/2001 | Nicholson et al. | 700/241 |
| 6,356,806 B1 * | 3/2002 | Grob et al. | 700/245 |
| 6,446,160 B1 * | 9/2002 | Le et al. | 711/112 |

FOREIGN PATENT DOCUMENTS

| | | |
|---|---|---|
| EP | 0049151 A2 | 4/1982 |
| EP | 0353584 A2 | 2/1990 |
| JP | 63-174889 A | 7/1988 |
| JP | 04-322987 A | 11/1992 |
| JP | 6-312389 A | 11/1994 |
| JP | 10-58362 A | 3/1998 |
| JP | 11-45105 A | 2/1999 |
| JP | 2004-199670 A | 7/2004 |

OTHER PUBLICATIONS

Supplementary European Search Report dated Apr. 8, 2010, issued in corresponding European Patent Application No. EP07713603.
Notification of Reason for Refusal dated Apr. 14, 2011, issued in corresponding Japanese Patent Application No. 2007-554874.

* cited by examiner

WORK ROBOT EXCELLENT IN WORK RESUMPTION

TECHNICAL FIELD

The present invention relates to a work robot capable of moving a known work device relative to a workpiece and executing intended work on the workpiece, and more particularly to a work robot that is excellent in work resumption.

In the present invention, the term "work" or "working" means operations primarily including supply and application of a liquid material, screwing, soldering, assembly, mounting, and so on.

BACKGROUND ART

In one example of known work robots, a work device, e.g., a device for applying or discharging a liquid material or a screwing means, is held to be able to move relative to a workpiece as a work target, and intended work is performed by relatively moving the work device and the workpiece. Such a work robot incorporates therein a program describing details of the work. Generally, the program is prepared by successively describing instructions for, by way of example, moving and operating a working means in the order in which the instructions are to be executed. An instruction for commanding some instructions within the program to be repeatedly executed is often included in the program as required.

For example, Patent Document 1 describes a desktop work robot for, e.g., screwing, in which a program is incorporated to be automatically executed.

Patent Document 1: Japanese Patent Laid-Open No. H06-312389

DISCLOSURE OF THE INVENTION

Problems to be Solved by the Invention

A work robot often undergoes interruption of work in a state where the work is not normally brought to an end in accordance with a program. Such an interruption occurs, for example, in the case where a worker determines an emergent condition and stops an emergency stop button, in the case where the work robot determines an error and is emergently stopped in an automatic manner, in the case where the work robot is stopped due to a power failure, and in the case where, though not in emergency, the worker intentionally cuts off a power switch to temporarily stop the work.

The occurrence of the above-described interruption results in a state that the intended work is not yet completed, i.e., that the work to be performed on a workpiece is also interrupted.

In such a state, the condition of the workpiece cannot be confirmed from the viewpoints of hardware and software. Therefore, the work cannot be resumed from the same state as that at the time when the program has been stopped. In other words, the workpiece has to be replaced with a new one and the program has to be executed again from the beginning.

Executing the program from the first instruction, however, means that the work performed on the workpiece so far cannot be continued and work has to be restarted on a new workpiece. Accordingly, the workpiece and the liquid material having been used in the interrupted work are wasted. When the workpiece and the liquid material are expensive, solving the problem of such waste is keenly demanded.

From the viewpoint of working time, it is also wasteful to restart the work on a new workpiece.

Further, if the program is forced to be interrupted because of, e.g., an emergency stop, the program needs to be stopped at once without waiting for that the work reaches a proper interruption point. When resuming the work, therefore, the program has to be executed again from the first instruction after performing calibration such as returning the work robot to the origin.

Another problem from the viewpoint of a human error resides in that, because of a tendency to overly take care of waste or loss caused by the forced stop, the worker may hesitate to determine the occurrence of an emergent condition in spite of the actual occurrence thereof, and the emergency stop may be delayed.

In view of the above-described problems, an object of the present invention is to provide a work robot capable of, even when a program is forced to end, resuming work from a working state immediately before the forced end.

Means for Solving the Problems

To solve the above-described problems, according to a first aspect of the present invention, there is provided a work robot comprising a holding unit for holding a known work device, relatively moving means for relatively moving a workpiece and the holding unit, an information processing unit, a storage unit, and a variable storage unit, the work robot performing intended work by relatively moving the holding unit and the workpiece in accordance with a program instruction, wherein when execution of the intended work is in progress, the program successively stores working state information in the variable storage unit, and when the program is forced to end in the middle of the intended work and then the intended work is to be resumed, the program resumes the work in accordance with the working state information stored in the variable storage unit.

According to a second aspect of the present invention, in the first aspect of the present invention, the variable storage unit includes a power source independent of a power source for supplying electric power to the work robot.

According to a third aspect of the present invention, in the first aspect of the present invention, the variable storage unit is a rewritable nonvolatile memory.

According to a fourth aspect of the present invention, in the first, second or third aspect of the present invention, the variable storage unit is a memory having a shorter read/write time than the storage unit.

According to a fifth aspect of the present invention, in any one of the first to fourth aspects of the present invention, the variable storage unit stores, as the working state information, a work number assigned for each of steps of the intended work.

According to a sixth aspect of the present invention, in any one of the first to fifth aspects of the present invention, the variable storage unit stores, as the working state information, absolute position information of the holding unit with respect to a reference position.

According to a seventh aspect of the present invention, in any one of the first to sixth aspects of the present invention, the work robot further comprises an emergency end switch for forcibly bringing the work performed by the known work device to an end.

According to an eighth aspect of the present invention, in any one of the first to seventh aspects of the present invention, the known work device is a discharge device or an application device.

According to a ninth aspect of the present invention, in the eighth aspect of the present invention, the variable storage unit stores, as the working state information, the number of times of discharges or applications which have been performed so far.

Effect of the Invention

With the present invention, since how far work has been performed immediately before any interruption of the program can be confirmed, the work can be resumed continuously from the step preceding the interruption even when the program is interrupted.

Also, even when power supplied to a control unit is shut down accidentally, the work can be resumed from the state immediately before the power-off, whereby waste of the workpiece, loss of working time, etc. can be minimized.

Figure 1:
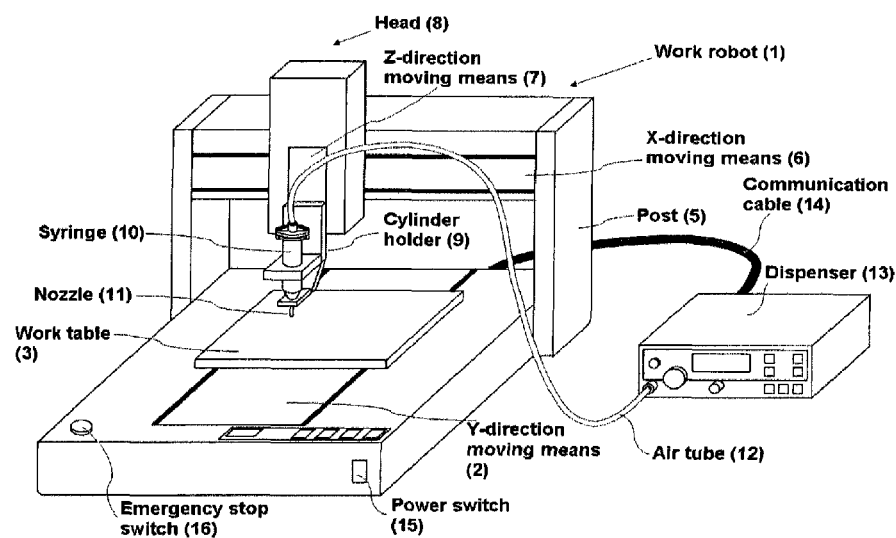
[FIG. 1] illustrates an example of an apparatus for successively applying (supplying) a liquid material to wells formed in a microplate by using a discharge device that is mounted to a desktop XYZ-orthogonal work robot.

DESCRIPTION OF REFERENCE CHARACTERS 1 work robot
2 Y-direction moving means
3 work table
4 intermediate plate
5 post
6 X-direction moving means
7 Z-direction moving means
8 head
9 syringe holder
10 syringe
11 nozzle
12 air tube
13 dispenser
14 communication cable
15 power switch
16 emergency stop switch
17 workpiece

BEST MODE FOR CARRYING OUT THE INVENTION

A work robot of the present invention comprises a holding unit for holding a known work device, relatively moving means for relatively moving a workpiece and the holding unit, an information processing unit, a storage unit, and a variable storage unit, the work robot performing intended work by relatively moving the holding unit and the workpiece in accordance with a program instruction, wherein when execution of the intended work is in progress, working state information is successively stored in the variable storage unit. In the case of the intended work being made up of 64 steps, for example, whenever (each time) processing of each step is executed, the state after the execution of each step is stored in the variable storage unit. With such a function, even when the program is forced to end in the middle of the intended work and then the intended work is to be resumed, the intended work can be continuously resumed in accordance with the working state information stored in the variable storage unit. Examples of the case where the program is forced to end include not only the case where a forced end switch is pressed, but also the cases where the forced end is caused due to, e.g., a power failure and disconnection or decoupling of a power cord.

The working state information stored in the variable storage unit should be never lost even with the forced end caused by an external situation. To that end, the variable storage unit preferably has a power source independent of a power source for the work robot so that the working state information stored in the variable storage unit is not lost, even when the power supplied to the work robot is shut down by, e.g., a power failure or a human-originated accident.

It is essential that the working state information is stored in a usable state when the work is resumed. To that end, when an assumed interruption time is short, a volatile RAM may be used as the variable storage unit in combination with a battery-type power source, e.g., a charging battery. When the assumed interruption time is long, the variable storage unit may be constituted by a rewritable nonvolatile memory, a flash memory, a hard disk, or the like, but due consideration is required regarding a limitation in processing speed.

Hardware employed for the variable storage unit is designed to be optimum, as required, from the viewpoints of the processing speed, data capacity, the assumed interruption time, and the cost.

Further, the variable storage unit is preferably made of a memory having a shorter read/write time than the storage unit to ensure that writing of data into the variable storage unit will not become a bottleneck in increasing an execution speed of the program.

The term "program" mentioned above means a program prepared by a user. The program is prepared on the user side in match with the known work device to be mounted and details of the intended work, and it is rewritable. A basic program not requiring rewrite is previously stored in a ROM included the storage unit, and it is not contained in the above-mentioned program.

The working state information is changed, as required, depending on the known work device that is held by the work robot of the present invention. For example, when the known work device is a discharge device, the state of movement of a plunger is also stored, in addition to relative positions of a workpiece and a nozzle, as the working state information. By storing those data, even when a forced end instruction is issued in the middle of the movement of the plunger, the movement of the plunger can be resumed from such an intermediate position as taken at the time of the interruption.

When predetermined work is repeatedly performed, a value corresponding to the number of times of repetitions may be held. In work to fabricate plural workpieces, a value corresponding to the number of fabricated workpieces may be held.

When fine accuracy is not required in the intended work, an amount of data to be stored can be reduced by storing the position information of the workpiece and the work device in the form of relative information.

Details of the present invention will be described below in connection with embodiments, but the present invention is in no way restricted by the following embodiments.

Embodiment 1

This Embodiment 1 is described in connection with, by way of example, an apparatus for successively applying (supplying) a liquid material to wells formed in a microplate by using a discharge device that is mounted to a desktop XYZ-orthogonal work robot.

FIG. 1 illustrates a desktop work robot (1).

The work robot (1) includes a work table (3) that is installed on a base to be movable in the Y-direction by a Y-direction moving means (2). A microplate (4), shown in FIG. 3, serving as a workpiece is placed on the work table.

Two posts (5) are installed near a rear end of the base on both sides thereof, and an X-direction moving means (6) is horizontally supported by the two posts above the base. A head (8) provided with a Z-direction moving means (7) is mounted to the X-direction moving means (6) to be movable in the X-direction. A syringe holder (9) is mounted to the Z-direction moving means (7) to be movable in the Z-direction.

A syringe (10) storing the liquid material therein is mounted to the syringe holder (9), and a nozzle (11) for discharging the liquid material is mounted to a lower end of the syringe (10) to be communicated with the interior of the syringe.

With the above-described construction, the nozzle (11), i.e., a working means, can be freely moved in three-dimensional directions with respect to the microplate (4), i.e., the workpiece (work target), which is placed on the work table.

An air tube (12) is attached at one end thereof to an upper end of the syringe (10) and is connected at the other end thereof to a dispenser (13). The dispenser (13) is capable of supplying air under a desired pressure to the air tube (12) for a desired time.

The dispenser (13) and the work robot (1) are interconnected by a communication cable (14) such that data can be transferred between the dispenser and the work robot.

On the base of the desktop robot (1), there are disposed a power switch (15) for turning on and off a power source for a main body of the desktop robot, and an emergency stop switch (16) with which a worker can forcibly bring the work to an end in the event that an unexpected emergent condition occurs during the work.

Figure 2:
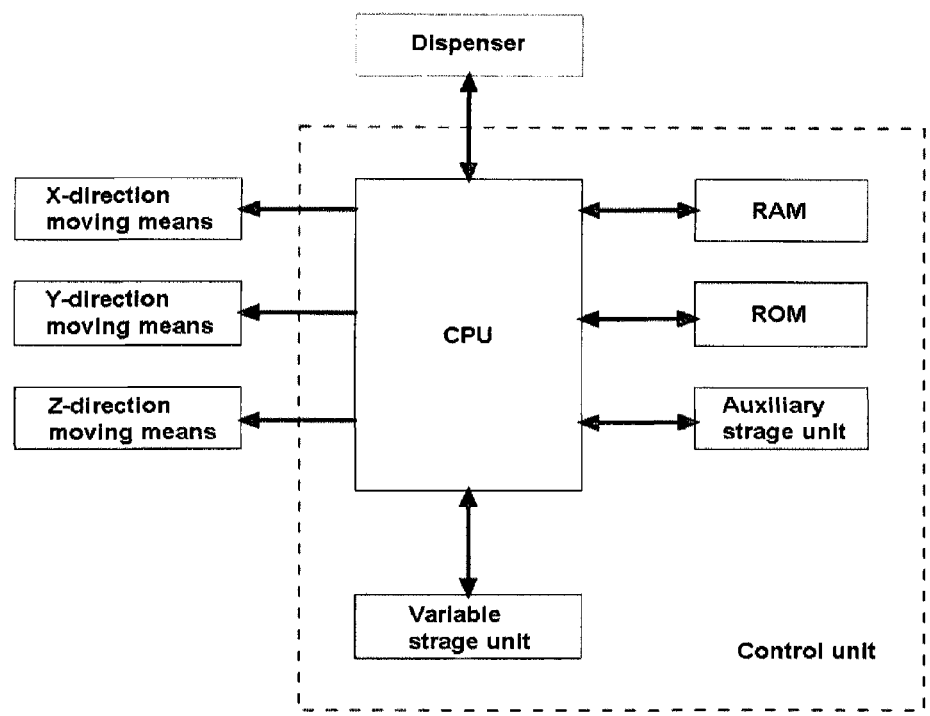
[FIG. 2] is a control block diagram of the work robot.

FIG. 2 is a control block diagram of the work robot.

Looking from the viewpoint of function, a main body control unit comprises a CPU for executing arithmetic and logical processing, and memories, including a RAM, a ROM and an auxiliary storage unit, which are connected to the CPU and have different functions.

The ROM is a readable, but unwritable memory and stores basic control instructions and information of the work robot, which are previously installed at the delivery of the work robot.

The RAM is a memory allowing data to be read and written at a high speed, and it primarily temporarily stores data generated during the execution of the program.

The auxiliary storage unit is a memory which is readable and writeable and is constituted such that data stored therein is not erased (reset) even when power supplied to the control unit is shut down. The auxiliary storage unit stores, e.g., a work program which has been prepared by a user and which describes details of the intended work.

The X-direction moving means (6), the Y-direction moving means (2), the Z-direction moving means (7), and the dispenser (13) are connected to the CPU for transmission and reception of various signals between them.

Further, the work robot includes a variable storage unit. The variable storage unit is a memory constituted, similarly to the auxiliary storage unit, such that data stored therein is not erased even when power supplied to the control unit is shut down. The variable storage unit stores values of various variables in real time during the execution of the program. The memory serving as the variable storage unit is constituted, for example, by a volatile memory connected to a power source, e.g., a battery, which is separate from the main power source for the control unit, or by a nonvolatile memory such as a hard disk or a flash memory. Since data is written into the variable storage unit in real time during the execution of the program, the variable storage unit preferably has a higher write speed than the auxiliary storage unit. A nonvolatile RAM or a like memory has a higher write speed. Thus, it is particularly preferable that such a volatile memory is employed and connected a battery so as to prevent the written data from being erased.

As a component in practical use, the variable storage unit may be a separate single unit or may share some parts constituting the auxiliary storage unit. However, since the values of the variables are changed from moment to moment, the variable storage unit is preferably constituted so as not to reduce a read/write speed even when it shares some parts with the auxiliary storage unit.

The values of all the variables in the program are not always required to be stored in the variable storage unit, and only the values of specific variables designated in the program may be stored therein. This reduces the number of the variables to be stored in the storage unit to the least necessary ones and hence contributes to cutting the read/write time with respect to the storage unit.

In this embodiment, the CPU corresponds to the information processing unit, and the ROM, the RAM and the auxiliary storage unit correspond to the storage unit. The CPU serving as the information processing unit receives signals regarding various kinds of information from the X- to Z-direction moving means, the dispenser, the ROM, the RAM and the auxiliary storage unit which serve as the storage unit, and the variable storage unit, and then executes information processing including arithmetic and logical operations, as required. Further, the CPU sends work instruction signals to the X- to Z-direction moving means and the dispenser, and also sends signals representing the information to be stored in the RAM and the auxiliary storage unit which are writable memories in the storage unit.

Figure 3:
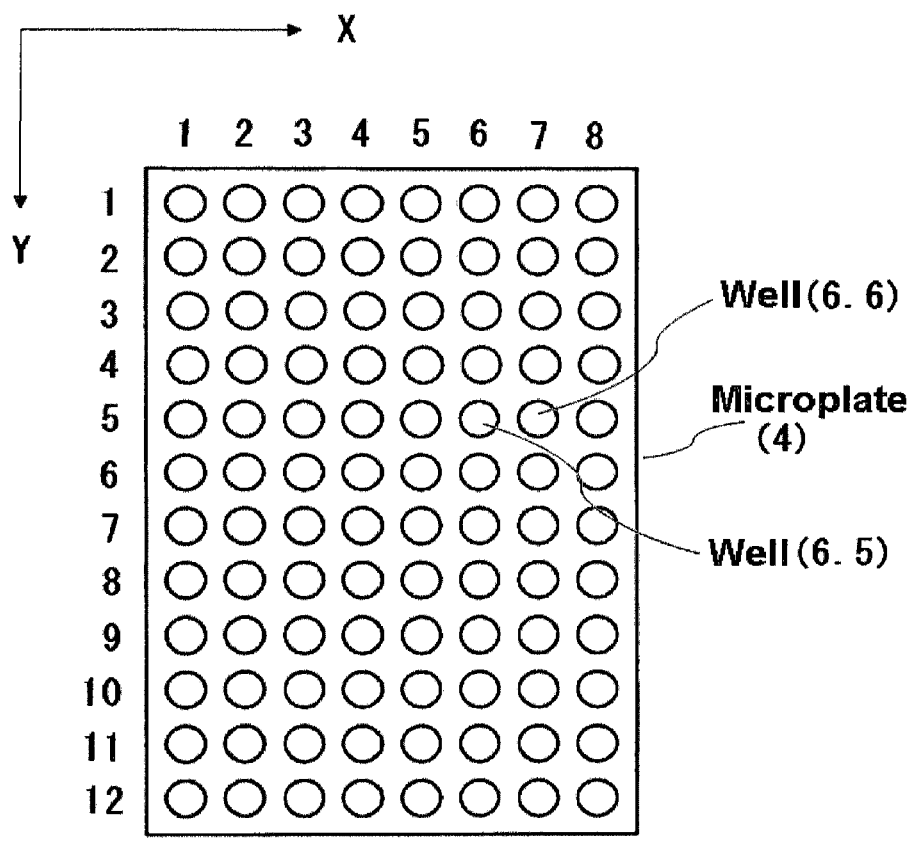
[FIG. 3] is a plan view of the microplate.

FIG. 3 is a plan view of the microplate. The microplate (4) has wells which are in the form of recesses capable of storing the liquid material therein and which are arrayed in a grid pattern at certain intervals in the XY-directions. In this embodiment, eight wells are arranged in the X-direction and twelve wells are arranged in the Y-direction.

In this embodiment, the liquid material is successively supplied to a group of wells arranged in the X-direction from the left toward the right. After the supply of the liquid material to the rightmost well in one well group is completed, the liquid material is likewise successively supplied to another group of wells, which are arranged in the X-direction at a position shifted from the preceding one well group by one interval in the Y-direction, from the left toward the right. By repeating the above-described supply operation, the liquid material is eventually supplied to all the wells in the microplate.

Herein, for the sake of explanation, the wells arrayed in the X-direction are denoted by numerals 1 to 8 successively from the leftmost well. Likewise, the wells arrayed in the Y-direction are denoted by numerals 1 to 12 successively from the uppermost well. Based on such numbering, each well is expressed by (number in the X-direction, number in the Y-direction). Thus, a well indicated by A in FIG. 3 is expressed by a well (6,5).

Figure 4:
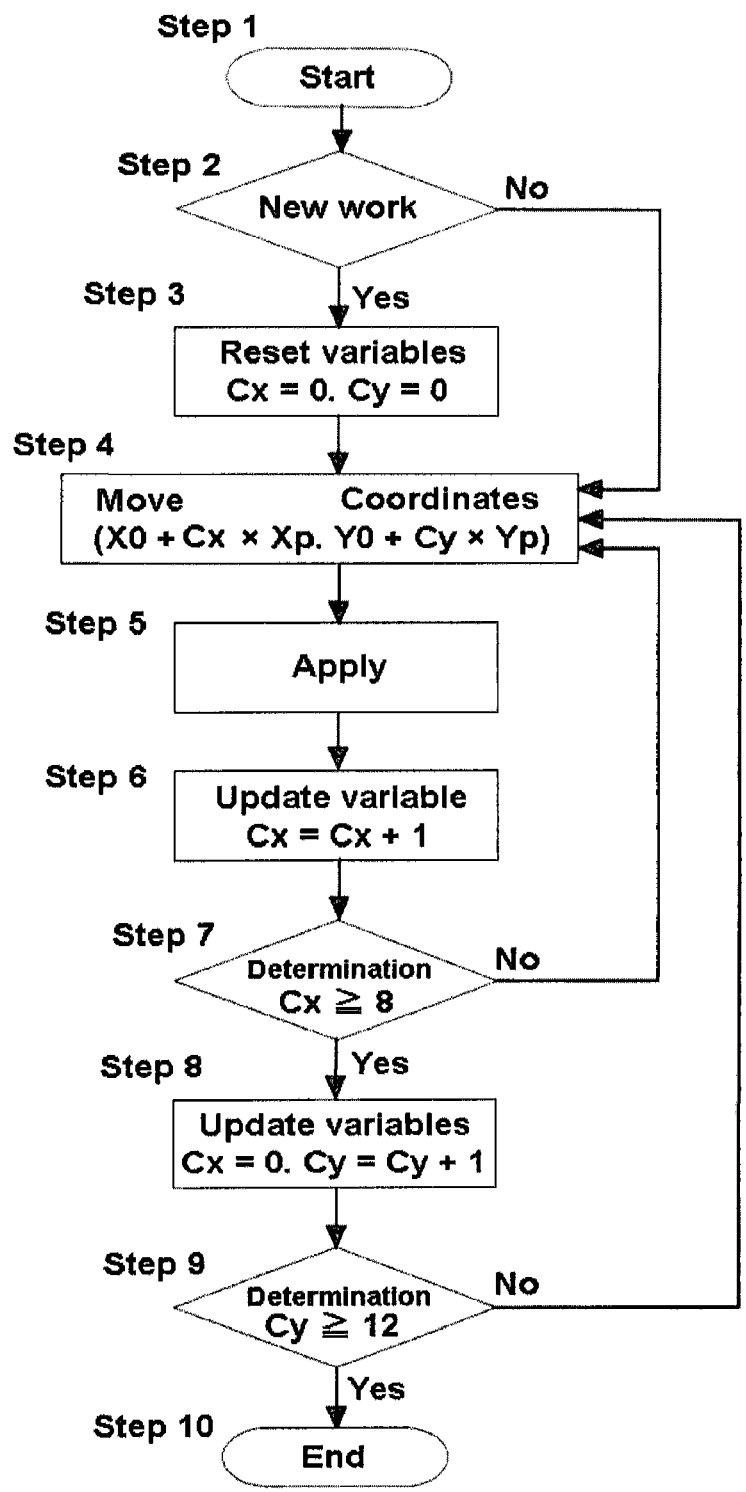
[FIG. 4] is a flowchart showing processing of a program in Embodiment 1, the program being prepared on the user side.

FIG. 4 shows one example of processing of a program, prepared on the user side, which is executed by the desktop robot for applying the liquid material to the microplate.

Cx and Cy are used as two variables stored in the variable storage unit in this embodiment. Cx corresponds to a position of the well in the X-direction of the microplate, and Cy corresponds to a position of the well in the Y-direction of the microplate.

X0 and Y0 represent respectively an X-coordinate value and a Y-coordinate value of a well (1,1) as viewed from a reference point (origin) of the work robot.

Also, Xp and Yp represent respectively values of intervals between the wells in the X-direction and the Y-direction, and they are fixed values not changed during the execution of the program.

While the value of each variable is incremented one by one in this embodiment, it may be decremented one by one instead. Further, it is needless to say that a value resulting from calculation based on plural variables can also be used as the variable.

First, it is determined whether work to be performed is new or a continuation of the preceding interrupted work (step 1). This determination can be made in accordance with an instruction by the worker or can be automatically made in accordance with information that has been stored in the storage means and indicates the interruption of the work.

In the case of new work (i.e., when the liquid material is applied to the microplate from the beginning), the variables Cx and Cy are reset such that 0 is put in each of the variables Cx and Cy (step 2).

Then, the nozzle is moved relative to the microplate (step 3). Coordinates to which the nozzle is to be moved are obtained based on a calculation formula of (X0+Cx×Xp, Y0+Cy×Yp). For example, at the beginning of new work, the liquid material needs to be applied to the well (1,1). At that time, because of Cx=0 and Cy=0, the coordinates of the well (1,1) are given by (X0,Y0) based on the above calculation formula.

After the nozzle has been moved to the desired well, the liquid material is supplied to the desired well (step 4). Herein, the liquid material in the syringe is discharged from the nozzle and is supplied to the well by transmitting a signal from the control unit of the desktop robot to the dispenser via the communication cable and causing the dispenser to supply air under a preset pressure to the syringe for a preset time through the air tube.

After the end of the application work, the value of the variable Cx is incremented by one (step 5), and whether the application work in the row direction is completed (i.e., whether $Cx \geq 8$ is satisfied) is determined (step 6). Because Cx represents the serial number of each of the wells arranged in the X-direction, which is counted from the leftmost well, the case of Cx<8 means that the nozzle does not yet apply the liquid material to the rightmost well, and the case of Cx=8 means that the nozzle has completed the application of the liquid material to the rightmost well. Therefore, if the value of Cx is less than 8, the operations of the steps 3 to 5 are repeated. If the value of Cx is 8, it is reset to Cx=0 and the value of Cy is incremented by one (step 7).

Subsequently, whether the application work in the column direction is completed (i.e., whether $Cy \geq 12$ is satisfied) is determined (step 8). Because Cy represents the serial number of each of the wells arranged in the Y-direction, which is counted from the leftmost well, the case of Cy<12 means that the nozzle does not yet apply the liquid material to the well (8,12) which is located at a lowermost rightmost position, and the case of Cy=12 means that the nozzle has completed the application of the liquid material to the rightmost well (8,12). Therefore, if the value of Cy is less than 12, the operations of the steps 3 to 5 are repeated. If the value of Cy is 12, this means that the application of the liquid material to all the wells is completed. Hence, the application work is brought to an end.

Thus, by moving the nozzle to the position corresponding to the XY-coordinates of each well with respect to the origin based on the variables Cx and Cy as described above, instructions for moving the nozzle to all the wells in the microplate can be provided using only one movement instruction without preparing movement instructions to designate the coordinates of all the wells.

While the series of instructions used in the above-described flowchart are executed by the control unit, shown in FIG. 2, within the work robot, the values of the variables Cx and Cy are stored in the variable storage unit as well in real time. As a result, even when application work is stopped at once without saving the variables, such as even when the emergency stop switch is pressed, or even when a power failure occurs, or even when any error is generated within the work robot, the values of the variables immediately before the stop can be kept remained.

By referring to the stored values of the variables, the work can be restarted as the continuation of the preceding work when resumed, even if the program is executed again from the beginning.

A flow of processing executed after resumption of the work will be described below in connection with a practical example.

For example, it is here assumed that an emergent condition occurs at the end of the step 5 after the application of the liquid material to the well (6,5) has been completed, and the work is interrupted by the emergency stop. In such a case, although the variables Cx and Cy take values Cx=6 and Cy=4, the information loaded in the RAM within the control unit is reset because the program is forcibly interrupted upon the pressing of the emergency stop button. However, the variables Cx and Cy stored in the variable storage unit are not reset and are held at the values Cx=6 and Cy=4 immediately before the forced end.

When the work is resumed, the program is started from the first instruction. In this case, "No" is selected in the step 1 and the processing shifts to the step 3 while the variables Cx and Cy maintain the values Cx=6 and Cy=4 taken at the time of the emergency stop.

The nozzle is moved in the step 3. Here, since the variables Cx and Cy take the same values Cx=6 and Cy=4 as those before the change (emergency stop), the nozzle is moved to a position of coordinates (X0+6×Xp, Y0+4×Yp). In other words, the nozzle is moved to the coordinates corresponding to the well (6,6) adjacent to the well (6,5) on the right side.

After the movement of the nozzle, the liquid material is supplied to the well (6,6) (step 6). The subsequent work is performed in the same manner as that when the emergence stop is not caused. Thus, the processing of the steps 3-8 is repeated so that the liquid material is applied to all the wells.

As described above, even when the program is restarted from the beginning, for example, upon the pressing of the emergency stop button, work can be performed as a continuation of the preceding work when resumed, because the values of the variables are held by the variable storage unit.

While the variables representing the values corresponding to the well position are set in this embodiment, the variables stored in the variable storage unit are not limited to the above-described usage, and various factors can be set as the variables. Some examples of the latter case are briefly described below.

As one example, the instructions of the program may be each numbered in sequence, and a variable may be set to represent the number. By using both the variables representing the values corresponding to the well position and the variable representing the number assigned to each instruction of the program in a combined manner in the above-described embodiment, it is possible to know information regarding, for example, whether the application of the liquid material has been completed, and whether update of the variable(s) has been completed. Accordingly, when the program is executed again from the beginning, work can be resumed in a state closer to that taken at the time of interruption of the work.

As another example, when the same work is performed on a plurality of workpieces, the variable may be set corresponding to the number of workpieces for which the work has been completed. In such a case, by executing a program designed to bring the work to an end when the desired number of workpieces is reached, the number of workpieces for which the work has been completed so far can be stored even when the work is interrupted. Further, the present invention is not limited to the case of the emergence stop in urgency. More specifically, when it is desired to turn off the power supplied to the work robot and to resume work next day, the number of workpieces for which the work has been completed can be continuously counted in the next day by referring to the number of workpieces which has been counted as the variable up to the yesterday.

In addition, the variable can be set corresponding to the number of times at which the liquid material has been discharged so far. By setting such a value as the variable, when the number of times of the discharges reaches a value indicating that the liquid material in the syringe has run out, it is possible to automatically move the working means to the origin and to notify the worker of the necessity of replenishing the liquid material by issuing an alarm. In such a case, even when the work is interrupted by the emergency stop, for example, information regarding an amount of the liquid material remaining in the syringe can be held continuously.

For designating the position of the work device, in this embodiment, the destination of movement of the work device is designated as coordinate values (absolute coordinates) from a reference point, i.e., the origin, by employing variables. The reason is that, although the destination of movement of the work robot can also be designated by using an amount of movement from a position before the movement to a position after the movement (i.e., relative coordinates), the position after the movement can be more accurately designated by using the absolute coordinates.

In the work robot, when the working means is moved, an uncontrollable minute error, e.g., out-of-synchronism of a driving means or an error of movement resolution, occurs inevitably, thus resulting in a minute deviation between the desired position and the position to which the working means has been actually moved. Accordingly, if the destination of the movement is designated by using the relative coordinates, there is a possibility that such a minute deviation may be so accumulated as to become a large deviation.

Particularly, in a robot provided with a relatively inexpensive moving means that has no means, e.g., a position sensor, to objectively measure an amount of movement and to compensate for a deviation of the movement, a significant effect can be obtained by moving the working means based on the absolute coordinates with a particular position being a reference. More preferably, an error in the movement can be further reduced by temporarily moving the working means to the reference position whenever the working means has been moved for the work, thus calibrating the position thereof.

When resuming the work, the work can also be resumed after calibrating the work robot, for example, by temporarily returning the work robot to the reference position, e.g., the origin. Particularly, in the event of the emergency stop, the work robot is stopped with top priority for the sake of safety of the worker. Therefore, other components, etc. may come into the disordered state. For that reason, it is preferable to resume the work after calibrating the work robot so as to eliminate the possible influence of the emergency stop.

Embodiment 2

A work robot of this Embodiment 2 has a basic construction similar to that in Embodiment 1. In an application device mounted to the work robot of this Embodiment 2, it is assumed that 50 cc of a liquid material to be applied is stored in the syringe, 1 cc of the liquid material is consumed for applying the liquid material to an application point A once, and 2 cc of the liquid material is consumed for applying the liquid material to an application line B once.

Figure 5:
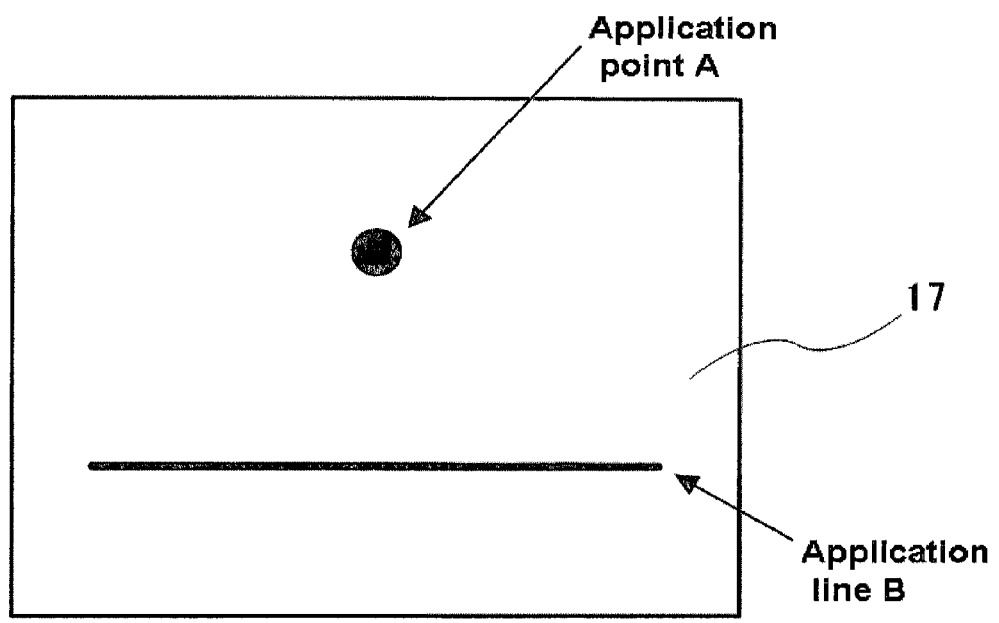
[FIG. 5] is a plan view of a workpiece on which work has been performed in Embodiment 2.

The workpiece used as a work target in this Embodiment 2 is, as shown in FIG. 5, a workpiece (17) in which the liquid material is applied twice, i.e., to the application point A and the application line B. The variables stored in the variable storage unit are provided by C1 and C2 as variables regarding the number of times of applications, and by C3 and C4 as variables regarding the number of workpieces. More specifically, C1 is the variable corresponding to the number of times at which the liquid material has been applied to the application point A, and C2 is the variable corresponding to the number of times at which the liquid material has been applied to the application line B. C3 is the variable corresponding to the number of workpieces for which the work has been completed, and C4 is the variable corresponding to the number of workpieces for which the work is to be performed.

Figure 6A:
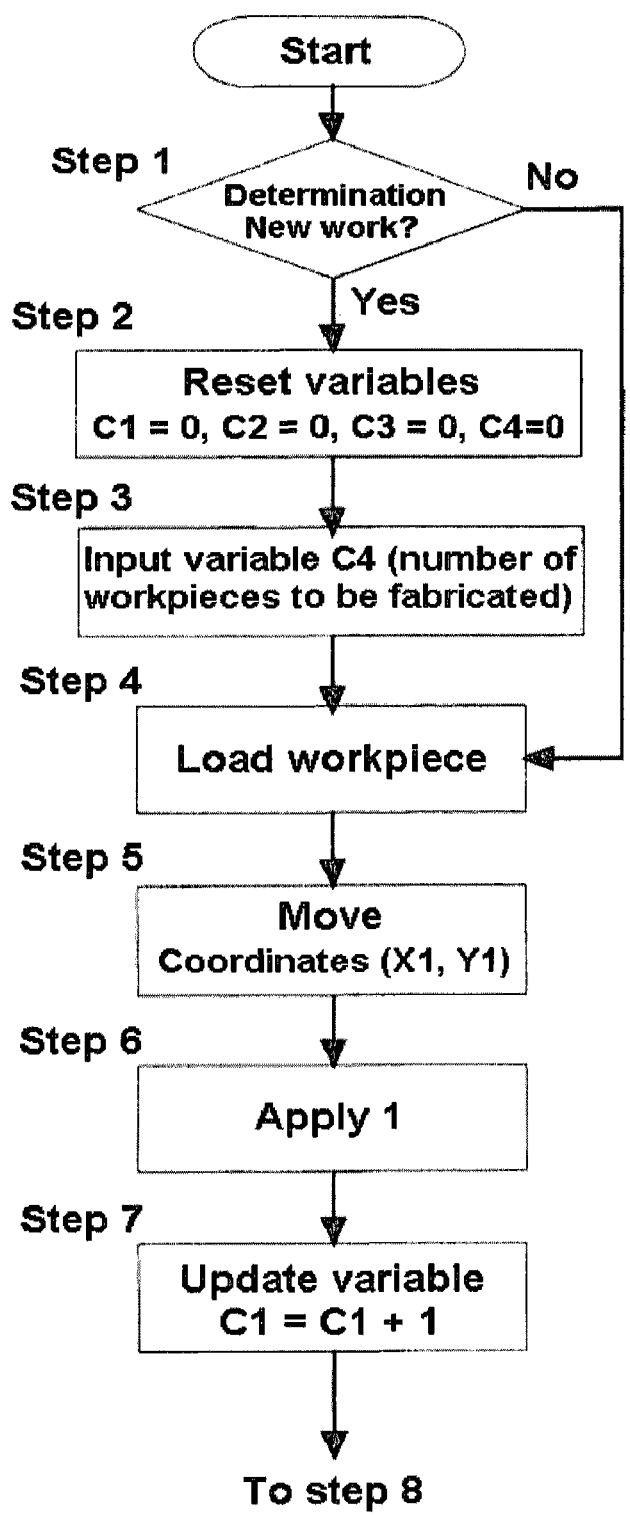
[FIG. 6a] is a flowchart (1/2) showing processing of a program in Embodiment 2, the program being prepared on the user side.
Figure 6B:
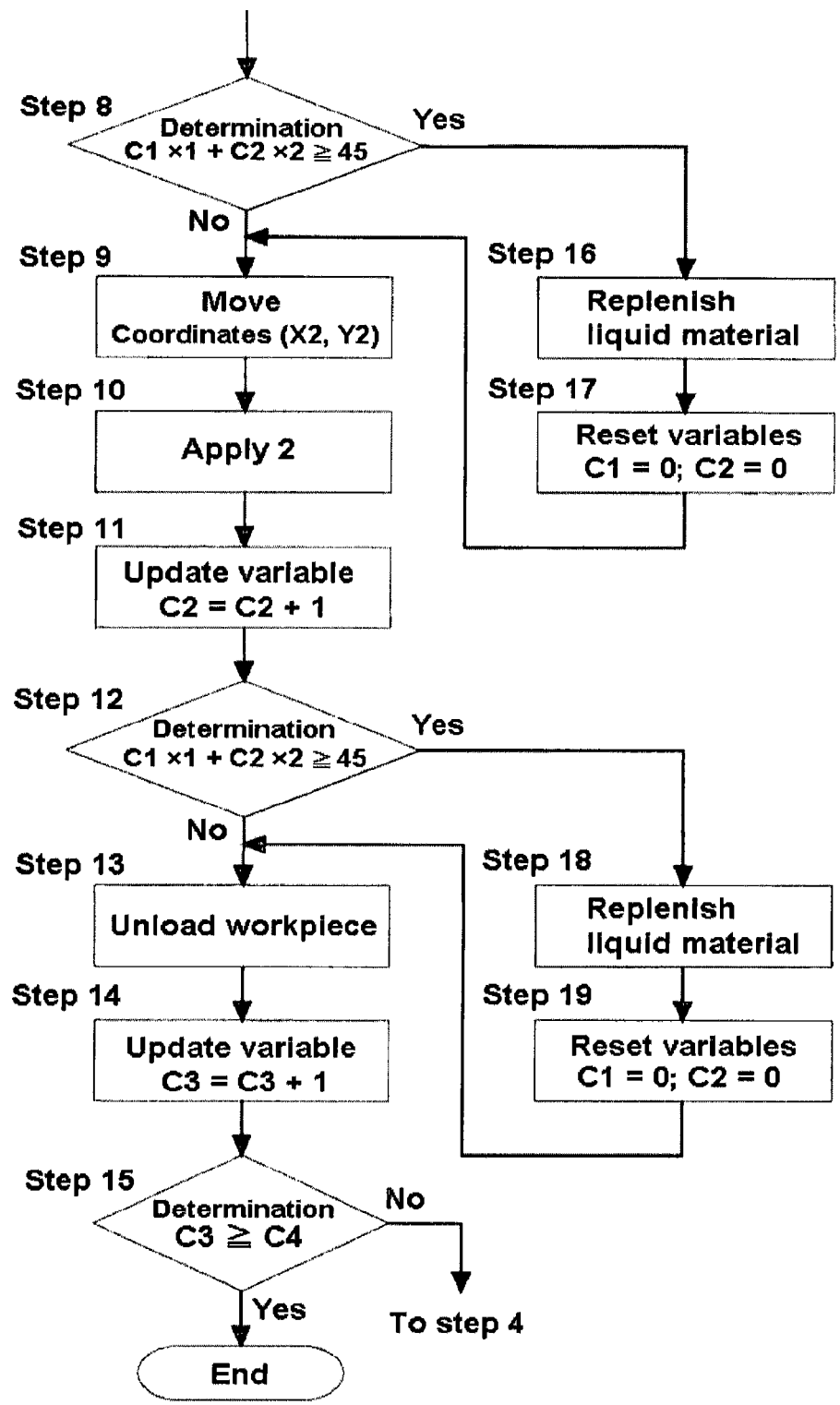
[FIG. 6b] is a flowchart (2/2) showing the processing of the program in Embodiment 2, the program being prepared on the user side.

FIG. 6 shows one example of processing of a program in this Embodiment 2, the program being prepared on the user side.

First, it is determined whether work to be performed is new or a continuation of the preceding interrupted work (step 1). In the case of new work, values of the variables C1, C2, C3 and C4 are all reset to 0 (step 2). Subsequently, the number of workpieces for which the work is to be performed is input as the value of C4 (step 3). In this embodiment, 20 is put in C4 on the assumption that the application work is to be performed on 20 workpieces. The variable is set through an input means (not shown). Thereafter, the workpiece is loaded onto the work table (3) (step 4).

Then, the nozzle is moved relative to the workpiece (step 5). Coordinates to which the nozzle is to be moved correspond to the coordinates of the application point A and have predetermined fixed values.

After the nozzle has been moved to the desired position, the liquid material is applied (step 6). Herein, the liquid material in the syringe is discharged from the nozzle and is applied in the form of a point onto the workpiece by transmitting a signal from the control unit of the desktop robot to the dispenser via the communication cable and causing the dispenser to supply air under a preset pressure to the syringe for a preset time through the air tube. At that time, the liquid material is applied in amount of 1 cc. The value of the variable C1 corresponding to the number of times at which the liquid material has been applied to the application point A is then incremented by one (step 7).

Subsequently, whether an amount of the liquid material remaining in the syringe approaches zero is determined based on a calculation formula (C1×1+C2×2≧45) by referring to the number of times of the discharges (step 8). When the liquid material is applied to the application point A once, C1 is multiplied by 1 because 1 cc of the liquid material is discharged. When the liquid material is applied to the application line B once, C2 is multiplied by 2 because 2 cc of the liquid material is discharged. The amount of the liquid material filled in the syringe is 50 cc. Thus, the above-mentioned formula is prepared to determine the necessity of replenishing the liquid material when 45 cc of the liquid material has been discharged, taking into account a margin.

If the determination result in the step 8 is "Yes", the liquid material is replenished (step 17). The liquid material can be replenished either automatically or manually by issuing an alarm. After replenishing the liquid material, because the amount of the liquid material stored in the syringe is returned to 50 cc again, respective values of the variables regarding the amount of the liquid material remaining in the syringe, i.e., C1 representing the number of times of the discharges toward the application point A and C2 representing the number of times of the discharges toward the application line B, are each reset to 0.

If the determination result in the step 9 is "No" or if the step 17 is completed, the nozzle is moved to the coordinates of a position from which the discharge toward the application line B is to be started, for applying the liquid material to the application line B (step 9). The coordinates of such a position have predetermined fixed values.

Thereafter, the liquid material is applied to the application line B on the workpiece (step 10). The application of the liquid material to the workpiece is performed by discharging the liquid material while the nozzle and the workpiece are relatively moved by the work robot, starting from the position to which the nozzle has been moved in the step 9. The liquid material is discharged by transmitting a signal from the control unit of the desktop robot to the dispenser via the communication cable and causing the dispenser to supply air under a preset pressure to the syringe for a preset time through the air tube. An amount of the liquid material corresponding to 2 cc is discharged for the application to the application line B.

Then, the value of the variable C2 corresponding to the number of times at which the liquid material has been applied to the application line B is incremented by one (step 11), and it is determined again whether the liquid material needs to be replenished (step 12).

If the determination result in the step 12 is "Yes", the liquid material is replenished (step 18) and the values of the variables C1 and C2 are each reset to 0 (step 19) similarly to the steps 16 and 17, respectively.

If the determination result in the step 12 is "No" or if the step 19 is completed, the workpiece is unloaded (step 13).

Then, the value of the variable C3 being equal to the number of workpieces for which the work has been completed is incremented by one (step 14), and whether the incremented number of workpieces reaches the number of workpieces for which the work is to be performed is determined by checking whether the value of C3 reaches the value of C4 (step 15).

If the determination result in the step 15 is "Yes", this means that the liquid material has been applied to the workpieces in the target number, i.e., 20. Accordingly, the work is brought to an end.

If the determination result in the step 15 is "No", the next workpiece is loaded onto the work table (3), followed by application of the liquid material to another new workpiece (step 4).

During the application work performed according to the above-described processing of FIG. 6, the values of the variables C1, C2, C3 and C4 are successively stored in the variable storage unit from moment to moment. As a result, the values of the variables immediately before the forced end (e.g., upon pressing of the emergency stop button, in the event of a power failure, or upon the occurrence of an error in the work robot) can be held remained.

Further, when resuming the work, the work can be started from the same state as that at the time of the forced end, by referring to the held values of the variables.

After the resumption of the work, "No" is selected in the step 1 of determining whether the work to be performed is new, and the processing is shifted to the step 4 with the values of the variables C1, C2, C3 and C4 remaining the same. Therefore, even when the program is restarted from the beginning after the forced end, the values of the variables C1, C2, C3 and C4 stored in the variable storage unit are kept the same as those at the time of the forced end, thus allowing the work to be resumed from the same state as that at the time of the forced end.

INDUSTRIAL APPLICABILITY

The present invention can be applied to not only desktop orthogonal-type work robot equipped with a combination of the XYZ-moving means, but also to any types of work robots so long as a workpiece and a working means are relatively moved therein. For example, those work robots include a robot that is movable only in one dimension, i.e., just in the X-direction, and a scalar robot that is moved along a curved line.

The present invention can provide an optimum effect when the work robot is combined with a device for discharging or applying a liquid from a nozzle or the like. However, the present invention is not limited to such usage, and the work robot may be combined with, e.g., a screwing device or means for picking up a part and mounting it to a workpiece.

The invention claimed is:

1. A work robot comprising a holding unit for holding a work device, relatively moving mechanism for relatively moving a workpiece and the holding unit, an information processing unit, a storage unit, and a variable storage unit, the work robot performing intended work by relatively moving the holding unit and the workpiece in accordance with a program instruction, wherein the program is a rewritable program prepared on a user side which includes variables and fixed values not changed during the execution of the program, when execution of the intended work is in progress, the information processing unit successively stores only the values of specific variables of said variables designated in the program as working state information in the variable storage unit, and when the program is forced to end in the middle of the intended work and then the intended work is to be resumed, the information processing unit resumes the work in accordance with the working state information stored in the variable storage unit.

2. The work robot according to claim 1, further comprising a main power supply supplying electric power to the work robot, and an auxiliary power supply supplying electric power to the variable storage unit to maintain the working state information stored in the variable storage unit when the main power supply is stopped.

3. The work robot according to claim 1, wherein the variable storage unit is a rewritable nonvolatile memory.

4. The work robot according to claim 1, wherein the variable storage unit is a memory having a shorter read/write time than the storage unit.

5. The work robot according to claim 1, wherein the variable storage unit stores, as the working state information, a work number assigned for each of steps of the intended work.

6. The work robot according to claim 1, wherein the variable storage unit stores, as the working state information, absolute position information of the holding unit with respect to a reference position.

7. The work robot according to claim 1, further comprising an emergency end switch for forcibly bringing the work performed by the work device to an end.

8. The work robot according to claim 1, wherein the work device is a discharge device or an application device.

9. The work robot according to claim 8, wherein the variable storage unit stores, as the working state information, the number of times of discharges or applications which have been performed so far.

10. The work robot according to claim 1, wherein the variable storage unit stores, as the working state information, only the values of designated variables in the program of all the variables in the program.

11. The work robot according to claim 6, wherein the program comprising the step of:
  judging whether a work to be performed is new or a continuation of the preceding interrupted work, and the work can be resumed after returning the work robot to the reference position in the case where the work is the continuation of the preceding interrupted work.

\* \* \* \* \*